Jan. 13, 1959

C. J. SEUR 2,868,100

CAMERA COMPRISING A PICK-UP TUBE AND A LENS
OBJECTIVE WITH A VARIABLE
EFFECTIVE APERTURE RATIO
Filed Oct. 26, 1955

INVENTOR
CRISTIAAN JACOBUS SEUR
BY
AGENT

United States Patent Office 2,868,100
Patented Jan. 13, 1959

2,868,100

CAMERA COMPRISING A PICK-UP TUBE AND A LENS OBJECTIVE WITH A VARIABLE EFFECTIVE APERTURE RATIO

Christiaan Jacobus Seur, Eindhoven, Netherlands, assignor, by mesne assignments, to North American Philips Company, Inc., New York, N. Y., a corporation of Delaware Application October 26, 1955, Serial No. 542,993

Claims priority, application Netherlands November 16, 1954

2 Claims. (Cl. 95—64)

A camera is known which comprises a pick-up tube and a lens objective having a variable, effective aperture ratio. One example thereof is a television recording camera comprising a pick-up tube constituted by a picture iconoscope. During operation the aperture ratio of the lens objective may be varied, for example, in order to obtain a greater sharpness in depth for a particular scenery than for another. It is known that by increasing the aperture ratio of the objective a greater quantity of light strikes the image screen of the camera. This is, in general, no objection for the conventional film cameras and photographic cameras; the conventional lightsensitve materials thereof have a sufficient resistance. However, with a camera comprising a pick-up tube, a greater aperture ratio of the objective gives rise to the risk that the light-sensitive element of the pick-up tube cannot stand these larger quantities of light.

In order to permit the use of great, effective aperture ratios of the objective with the last-mentioned type of cameras, the camera according to the invention has the feature that a filter having a variable permeability to light is arranged in addition on the path of the light in front of the pick-up tube. This filter is constituted by an elastic, taut light-pervious skin provided with means to adjust its tension. In this camera the adjusting means for the aperture ratio of the objective and for the permeability of the filter to light are coupled with one another in a manner such that upon a variation of the effective angular aperture of the lens the permeability of the filter is varied in opposite sense. Thus, for example, with a larger effective aperture ratio of the lens the permeability of the filter to light can be reduced, in a structurally simple manner, so that the luminous flux striking the pick-up tube does not increase directly proportionally to the increase in effective aperture ratio of the objective. The mechanism coupling the adjusting means of the diaphragm and the filter will be designed in accordance with the greater or smaller light-sensitivity of the screen.

The invention will be described more fully with reference to the drawing.

Fig. 3 shows partly in a view and partly in a longitudinal section the filter, the diaphragm, the lens, the device controlling the filter and the diaphragm and the guiding device for the filter.

Figure 1:
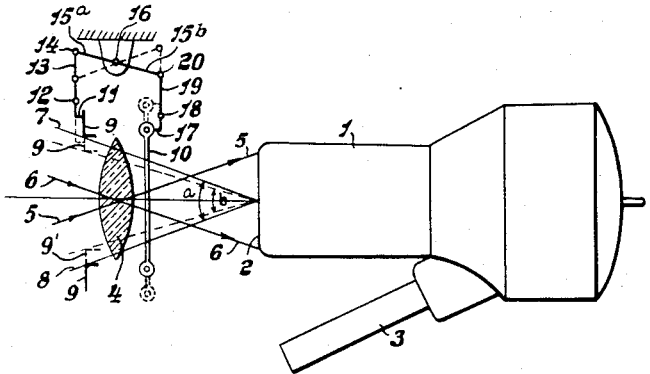
Fig. 1 shows diagrammatically one embodiment of the pick-up tube used in the camera according to the invention, comprising the lens objective (termed hereinafter the lens) the device to vary the aperture ratio (termed hereinafter the diaphragm) and the filter of variable light permeability (termed hereinafter the filter) and the mechanism controlling the diaphragm and the filter.

Referring to Fig. 1, reference numeral 1 designates the pick-up tube, constructed as an image inconoscope. It is provided with a photo-cathode at 2, reference numeral 3 designates the electron gun of the tube. The electrical conductors for the image iconoscope are not shown in Fig. 1. The image iconoscope co-operates with the lens 4. The photo-cathode 2 is spaced apart from this lens approximately by the focal distance. The light beams 5 and 6 designate the main directions of the extreme beams captured by the photo-cathode 2 via the lens 4. Reference numerals 7 and 8 designate the outer boundaries of the angular aperture $a$ of the lens 4, when the diaphragm 9 is completely opened.

As stated above, a diaphragm co-operates with the lens 4. If this diaphragm is closed over a certain distance and occupies the position 9', the angular aperture is, of course, reduced from the initial value $a$ to the value $b$.

The lens 4 co-operates furthermore with the filter 10. This filter comprises a stretched, elastic film which is pervious to light and which may be constituted, for example, by an elastic synthetic substance. If this film is drawn radially to the outside and is thus stretched, its thickness is reduced and its filtering or absorbing effect on the passing light will be smaller. If the diaphragm 9 and the filter 10 are intercoupled in a manner such that upon a variation of the effective aperture ratio of the lens the light permeability of the filter is varied in an opposite sense, it is achieved that even with a high aperture ratio of the lens 4 the quantity of light striking the photo-cathode 2 of the pick-up tube 1 will not be such that it could not be worked up satisfactorily by this photo-cathode.

The said coupling is shown diagrammatically in Fig. 1. It is assumed that by a radial displacement of the diaphragm elements, the aperture ratio thereof can be varied. The diaphragm is provided with a coupling piece 11, which is connected via a pivot 12, a connecting element 13 and a pivot 14 with the arm 15a of a two-armed lever, which is rotatable at 16 about a fixed point. In a similar manner the filter 10 is connected via a coupling piece 17, a pivot 18, a connecting element 19 and a pivot 20 with the other arm 15b of the said two-armed lever. Upon a rotation of the two-armed lever about the point 16, the aperture ratio of the lens 4 and the light permeability of the filter 10 will be varied in opposite sense. The absolute ratio between the motion of the filter and the diaphragm may be varied by suitable choice of the longer of the lever arms 15a and 15b.

Figure 2:
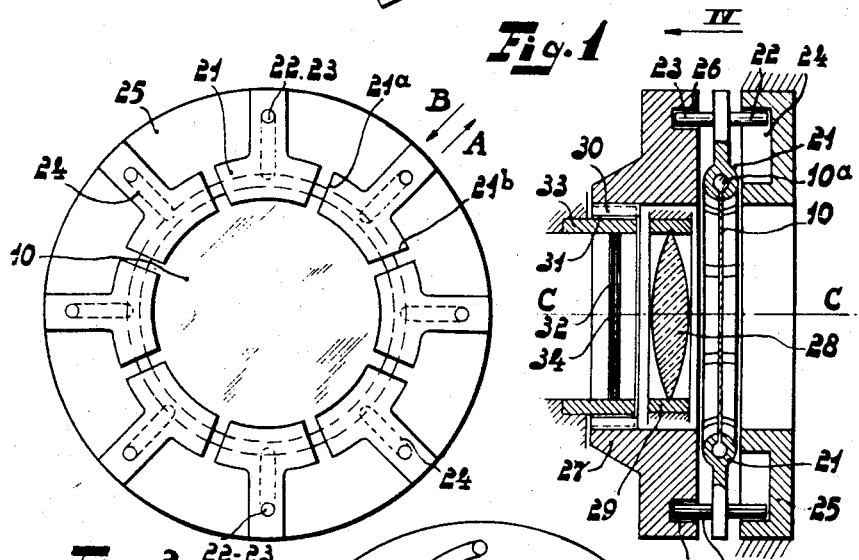
Fig. 2 is a front view of the filter with the associated stretching device.
Figure 4:
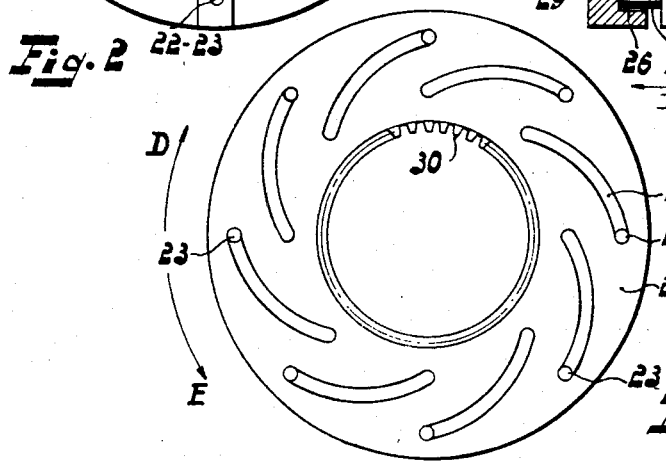
Fig. 4 shows the control-device for the filter and the diaphragm in a front view, taken in the direction of the arrows IV—IV of Fig. 3.

With reference to Figs. 2, 3 and 4 one embodiment of the coupling mechanism between the filter and the diaphragm will be described.

The film 10, made from an elastic light-pervious synthetic substance, is provided with a thickened edge 10a, which is held in clamping pieces 21. These clamping pieces have side surfaces 21a and 21b such that they can perform unhindered a certain radial movement (in the directions of the arows A and B). These clamping pieces are provided each on each side with opposite pins 22 and 23. The pins 22 are movable in radial slots 24, provided in a stationary annular structural part 25. The pins 23 are movable in arcuate guiding slots 26, provided in an annular structural part 27, rotatable about the system axis C—C. The annular structural part includes the objective 28, held in a holder 29. Over part of its inner periphery the annular structural part 27 is provided moreover with a tooth rack 30, co-operating with an outer tooth rack 31, provided on the outer periphery of the diaphragm 32, held in a support 33. This carrier cannot rotate with respect to the system axis C—C.

This device operates as follows: It is assumed that the diaphragm constructed as in iris diaphragm is substantially completely closed (only the aperture 34 is left between the inner boundaries of the iris parts) and that the filter 10 occupies the extreme stretched position (the pins 23 are located at the outer ends of the arcuate guides 26); upon a rotation of the annular element 27 in the direction of the arrow D, the pins 23 will be moved to the inner side owing to the shape of the arcuate slots 26, so that the clamping pieces 21 move in the direction B. Upon this movement the clamping pieces are guided by the pins 22 moving in the radial slots 24. During this movement the tension of the film 10 decreases, so that the latter assumes a larger thickness and thus exerts a stronger light-absorbing effect. Upon a rotation of the element 27 in the direction of the arrow D, the inner tooth rack 30 moves along the outer tooth rack 31 on the outer side of the holder 33 of the diaphragm, so that the diaphragm is opened. Upon a further movement of the annular element 27 in the direction of the arrow E, the operations are performed in an opposite sense.

What is claimed is:

1. A diaphragm and filter arrangement for a camera including a lens objective comprising a light-pervious filter constituted of an elastic taut film positioned in the path of light, first means to adjust the tension of said film, second means to adjust the aperture ratio of said lens objective, and means coupling said first and second means whereby upon variation of the aperture ratio of said lens the tension of said film is varied to thereby change the light permeability of the filter in an opposite sense.

2. A diaphragm and filter arrangement for a camera including a lens objective as claimed in claim 1 further comprising a rotatable annular element mounting the light objective and provided with a plurality of arcuate slots therein, a part of said coupling means projecting through at least one of said slots whereby upon rotation of said annular member said aperture ratio of said lens objective is varied and the tension of said film simultaneously varied in an opposite sense.

References Cited in the file of this patent

UNITED STATES PATENTS 2,431,824     Pach                    Dec. 2, 1947

FOREIGN PATENTS 444,074     Great Britain            Mar. 12, 1936